UNITED STATES PATENT OFFICE.

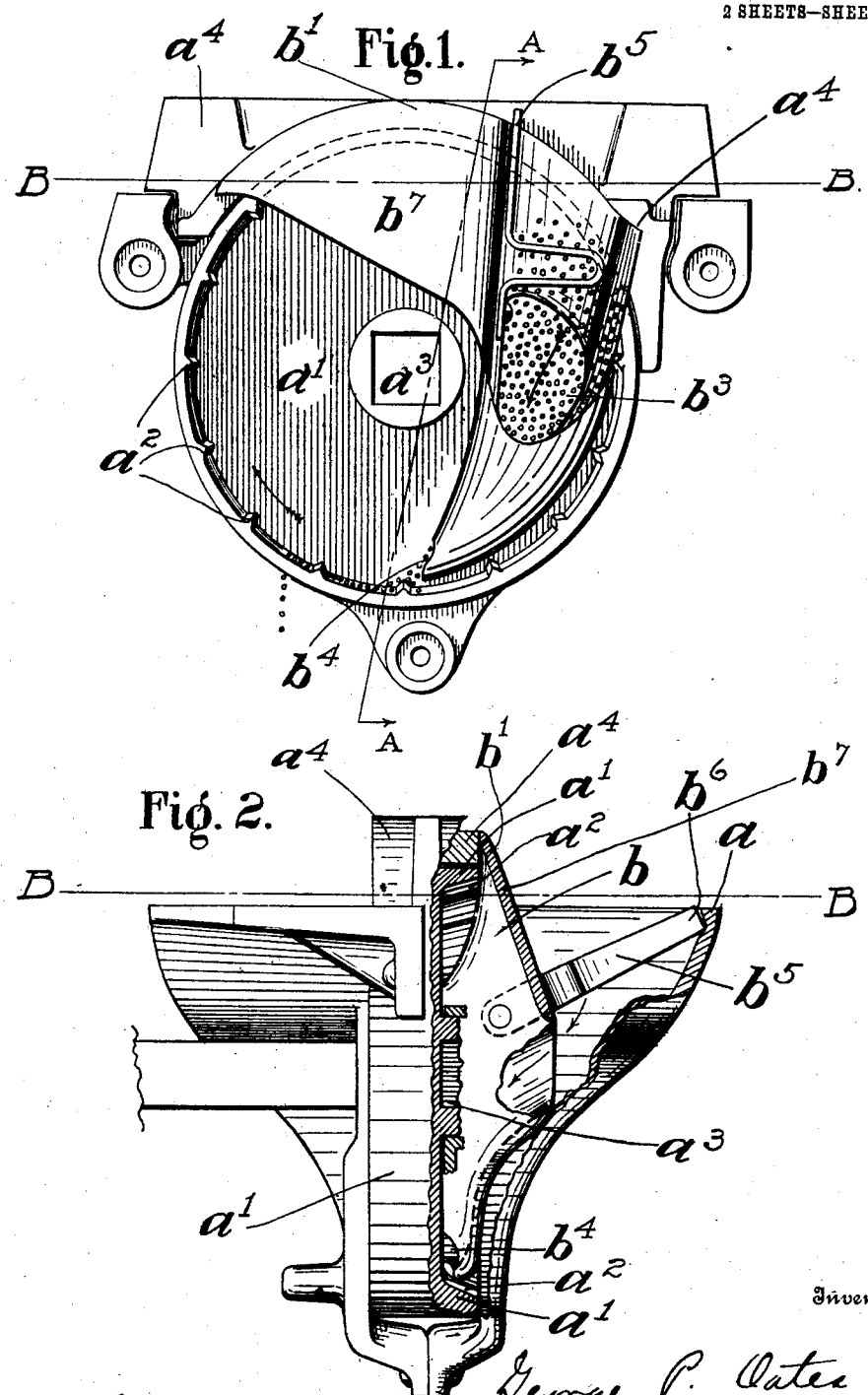

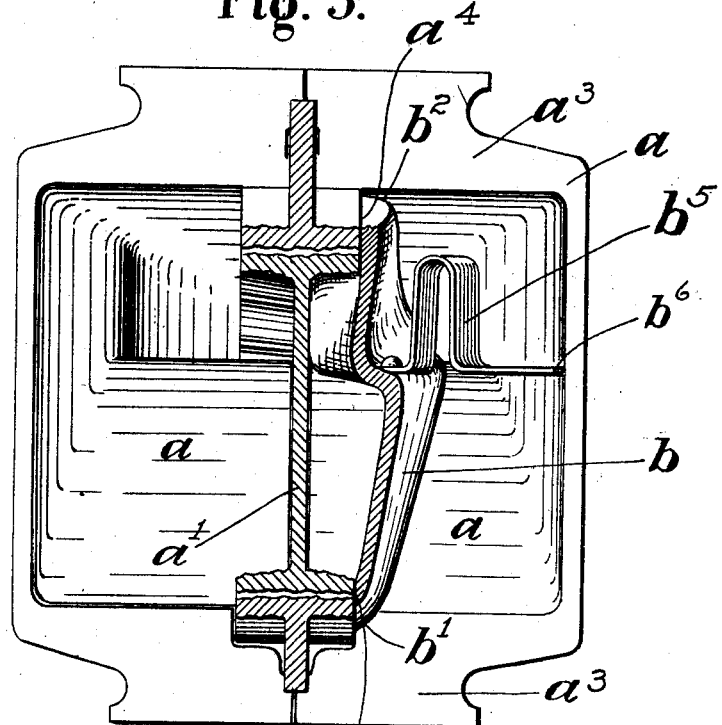
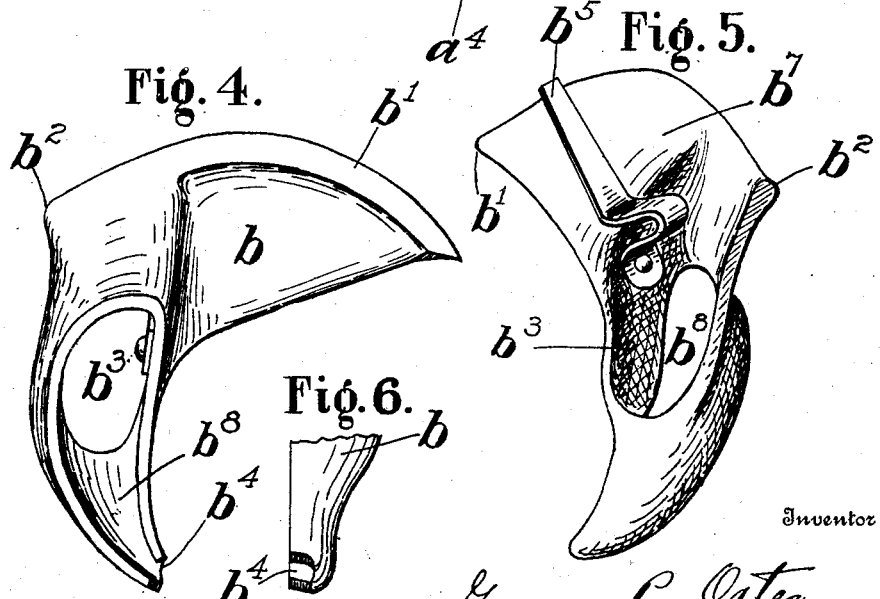

GEORGE P. OATES, OF SPRINGFIELD, OHIO, ASSIGNOR TO THE AMERICAN SEEDING MACHINE COMPANY, OF SPRINGFIELD, OHIO, A CORPORATION OF OHIO.

DISTRIBUTER FOR SEEDING-MACHINES.

No. 866,671.    Specification of Letters Patent.    Patented Sept. 24, 1907.

Application filed May 11, 1907. Serial No. 373,134.

*To all whom it may concern:*

Be it known that I, GEORGE P. OATES, a citizen of the United States, residing at Springfield, in the county of Clark and State of Ohio, have invented certain new and useful Improvements in Distributers for Seeding-Machines, of which the following is a specification.

My invention relates to improvements in distributing mechanism for grain drills, and particularly that kind of distributing mechanism which is adapted for sowing large varieties of seeds, including large size seeds such as wheat, and small seed such as grass seed, so that the distributer may be converted into a grass seed distributer. It is particularly adapted to that type of distributer known as the ordinary internal flanged type, and by my arrangement of parts there is produced a simple, durable and effective convertible distributer.

The particular object I have is to construct the parts so that when the distributer is converted into a grass seed distributer for distributing small seeds the ribs formed on the flange of the feed wheel will no longer act to force the seed through the distributer but will act solely as conveyers of the seed, and the vertical web of the wheel will become the means for forcing the seed through the hopper and measuring channel.

I have employed a skeleton form of reducing element, or supplemental measuring channel, which is so arranged within the hopper that the seed is deflected from the upper part of said hopper against the side of the case and in turn deflected against the feed wheel in a manner that will insure its proper distribution, and the parts are so related that there is no danger of the ribs on the flange of the wheel injuring the seed. The seed is in fact directed from the discharge end of the reducing element, or supplemental measuring channel, so that the ribs formed on the flange cannot pass across the path of movement of the seeds but rather the seeds are deflected against the vertical web of the wheel, the ribs acting merely as conveyers to carry the seed to the discharge opening of the distributer proper.

Referring to the accompanying drawings, Figure 1 is a side view with the near half of the casing removed showing the internal flanged wheel and the reducing element in position within the hopper. Fig. 2 is an end view partly broken away and shown in section, the section being on the line A A of Fig. 1, looking toward the right. Fig. 3 is a sectional view taken on the line B B of Figs. 1 and 2, looking down. Fig. 4 is a side view of the reducer, the side being that which lies adjacent to the distributing wheel. Fig. 5 is a perspective view of the opposite side of the reducer. Fig. 6 is a detail of the discharge mouth of the same.

Like parts are indicated by similar letters of reference throughout the several views.

In the ordinary internal flanged wheel distributer, the hopper, $a$, is usually formed with a compartment on each side of the wheel. I therefore select for illustration this type of a distributer which is known as the "double hopper distributer". The wheel, $a^4$, is formed with the ribs, $a^2$, on the internal flanges thereof, and said wheel is shown adapted to rotate in the direction of the arrow (Fig. 1). The feed shaft extends through the opening, $a^3$, and is connected in the usual manner so that the wheel may be rotated continuously. The rim of the wheel extends below the top of the hopper and also below the curved bridge, $a^4$, and the grain flows from the regular feed box carried by the machine into the hopper of the distributer.

I have shown the reducing element, $b$, of peculiar skeleton shape. The upper part, $b^7$, of the reducer is formed as a deflecting table to lie within the upper part of the hopper. The shoulder, $b^2$, fits against the end of the stationary casing, as indicated in Fig. 3, and the upper curved edge of the reducing element fits against the bridge, $a^4$. (See Figs. 1 and 2). There is an opening, $b^3$, on one side of the reducer, which, when the reducing element is fitted securely within the hopper of the distributer, acts in coöperation with the stationary casing and the deflecting table, $b^7$, to direct the seed in the direction of the arrows shown in Fig. 2, and by this direction given the seed it flows against the movable vertical web of the feed wheel which acts to force the seed downwardly toward the discharge end, $b^4$, of the reducer; the reducer being cut away as indicated at $b^8$, from a point opposite the opening, $b^3$, down to the discharge mouth of the same, as shown in Fig. 4. It is apparent that the lower part of the reducer therefore acts in coöperation with the vertical web of the feed wheel to form a channel, the web constituting a movable wall of the channel and the wall of the reducer constituting the opposite side thereof. When the reducer is fitted properly within the hopper, as hereinbefore explained, the discharge end, $b^4$, of the reducer is so formed and lies in such position that the seed is directed at the discharge end against the web of the wheel at that point, and after the feed wheel draws the seed away from the discharge end of the reducer, the seed drops upon the flange of the wheel, as indicated in Fig. 1, and is thereupon carried to the point where it is discharged from the distributer.

I have preferably employed a small, flat, loop-shaped spring, $b^5$, which is adapted to hold the reducer yieldingly in its proper position. The end, $b^6$, of said spring, as shown in Fig. 3, is adapted to bear against the side of the hopper, a, and a small notch may be employed to hold this spring in proper adjusted position. In this way the pressure of the spring is exerted in a downwardly and lateral direction causing the upper part of the reducer to fit tightly against the face of the bridge, $a^4$, and holding the reducing element in such position that the discharge end of the reducer will be maintained in proper position, as hereinbefore explained. In this arrangement of the parts, the broad deflecting table of the reducing element, b, lies flush with the curved edge of the bridge, $a^4$, which is located above the feed wheel, and the grain flowing into the hopper is readily deflected by the inclined table-like part of the upper part of the reducer, b, against the wall of the casing and then by the wall toward the opening in the reducer until it drops within the opening, $b^3$, and against the wheel (as indicated in Fig. 1) and is positively conducted by the feed wheel through the discharge end of the reducing element. By reason of this construction, the quantity of seed can be governed entirely by the speed of the distributing wheel, and in this kind of mechanism it is to be remembered that there are usually employed means for varying the speed of the wheel.

Having thus described my invention, I claim:

1. In a grain distributer, the combination of rotatable feed wheel and hopper or casing, a reducing element, the upper part of which is of table-like form, and a measuring channel inclosed on one side and open on the opposite side thereof and formed in the lower part of the reducer, substantially as specified.

2. In a grain distributer, the combination of a stationary hopper, with a movable vertical feed wheel, a reducer with an open-sided channel, and means for holding the reducer in close proximity to the feed wheel whereby the feed wheel will form a movable wall for said channel, substantially as specified.

3. In a grain distributer, the combination of a stationary hopper, a revoluble feed wheel within the hopper, a reducer having its upper part formed of a table-like form and its lower part perforated midway with a channel extending from the perforation to the end of the reducer, and means for yieldingly holding the reducer in position within the distributer.

4. In a grain distributer, the combination of a stationary hopper, a revoluble feed wheel within the hopper, a reducer having its upper part formed of table-like form and its lower part perforated midway with a channel extending from the perforation to the end of the reducer, and a loop-shaped spring for yieldingly holding the reducer in position within the distributer.

5. In a grain distributer, the combination of a stationary hopper, a revoluble feed wheel within the hopper, a supplemental skeleton frame reducer inserted within the hopper, having an opening midway thereof, a hollow cone-shaped channel extending from the opening to the end of the reducer, and a discharge orifice at the lower end thereof, substantially as specified.

6. In a grain distributer, the combination of a revoluble vertical feed wheel, a stationary hopper, a reducer located within the hopper and alongside the vertical feed wheel, an inverted hollow cone-shaped channel within the reducer having one side thereof open, the web of the vertical feed wheel forming a movable wall to said channel, a deflecting surface formed at the upper part of the reducer for the purpose of deflecting the grain downwardly and coperating with the wall of the hopper to force the grain toward the web of the feed wheel.

7. In a grain distributer, the combination of a stationary hopper, a vertical flanged feed wheel, a reducer located within the hopper and alongside of the feed wheel, a hollow cone-shaped channel within the reducer, the discharge end being located above the flange of the wheel, and shaped to direct the grain against the web of the wheel, for the purpose specified.

8. In a grain distributer, a stationary hopper, a vertical flanged feed wheel within the hopper, an open-sided reducer in close proximity to the feed wheel, a discharge opening at the end of the reducer terminating against the web of the feed wheel and above the flange thereof, substantially as specified.

9. In a grain distributer, the combination of a stationary hopper, a feed wheel within the hopper, a bridge above the feed wheel near the top of the distributer, a reducer having its upper edge in contact with the edge of the bridge, an open-sided channel formed within the reducer, the feed wheel forming a movable wall to said channel, substantially as specified.

10. In a grain distributer, the combination of a stationary hopper, a revoluble feed wheel within the hopper, a reducer also within the hopper, an open-sided channel, the walls thereof converging near the bottom of the hopper, a discharge orifice at the lowermost edge of the reducer directed toward the web of the feed wheel, substantially as specified.

In testimony whereof, I have hereunto set my hand this 6th day of May 1907.

GEORGE P. OATES.

Witnesses:
FRANK R. PACKHAM,
CHAS. I. WELCH.